United States Patent
Sinha et al.

(10) Patent No.: US 9,998,438 B2
(45) Date of Patent: Jun. 12, 2018

(54) VERIFYING THE SECURITY OF A REMOTE SERVER

(71) Applicant: Microsoft Technology Licensing, LLC, Redmond, WA (US)

(72) Inventors: Saurav Sinha, Bellevue, WA (US); Gopinathan Kannan, Redmond, WA (US); Nathan Ide, Bothell, WA (US); Shawn Corey, Kirkland, WA (US); Tony Ureche, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 14/061,621

(22) Filed: Oct. 23, 2013

(65) Prior Publication Data

US 2015/0113618 A1 Apr. 23, 2015

(51) Int. Cl.
*H04L 29/06* (2006.01)
*G06F 21/44* (2013.01)
(Continued)

(52) U.S. Cl.
CPC .............. *H04L 63/08* (2013.01); *G06F 21/44* (2013.01); *G06F 21/57* (2013.01); *G06F 21/575* (2013.01); *H04L 9/3263* (2013.01); *H04L 63/0823* (2013.01); *H04L 63/0876* (2013.01); *H04L 63/107* (2013.01); *H04L 63/1483* (2013.01); *G06F 2221/2111* (2013.01);
(Continued)

(58) Field of Classification Search
CPC .................. G06F 21/57; G06F 21/575; G06F 2221/2115; G06F 2221/2111; G06F 2221/2133; G06F 2221/2143; G06F 21/44; H04L 63/08; H04L 63/0823; H04L 63/1037; H04L 9/0825; H04L 9/083; H04L 9/32; H04L 9/3202; H04L 9/321; H04L 9/3226; H04L 9/3234; H04L 9/3247; H04L 63/0876; H04L 63/107; H04L 63/1483; H04L 9/3263; H04L 2209/76
See application file for complete search history.

(56) References Cited

U.S. PATENT DOCUMENTS 7,711,951 B2  5/2010  Chao
8,112,798 B2  2/2012  Frank et al.
(Continued)

FOREIGN PATENT DOCUMENTS

WO     2008026086 A2     3/2008

OTHER PUBLICATIONS

Yoshihama, et al., "WS-Attestation: Efficient and Fine-Grained Remote Attestation on Web Services", In Proceedings of the IEEE International Conference on Web Services, Jul. 11, 2005, 8 Pages.*
(Continued)

*Primary Examiner* — Eleni A Shiferaw
*Assistant Examiner* — Alexander R Lapian
(74) *Attorney, Agent, or Firm* — Arent Fox LLP

(57) ABSTRACT

In one embodiment, a client device 110 may use an attestation service 140 to verify a secure server 120. The secure server 120 may receive a signed trusted credential 310 from an attestation service 140 validating the secure server 120 as trustworthy to a client device 110 seeking access. The secure server 120 may protect the signed trusted credential 310 in a server secure module 280.

17 Claims, 19 Drawing Sheets

(51) Int. Cl.
*G06F 21/57* (2013.01)
*H04L 9/32* (2006.01)
(52) U.S. Cl.
CPC ............... *G06F 2221/2115* (2013.01); *G06F 2221/2133* (2013.01); *G06F 2221/2143* (2013.01); *H04L 2209/76* (2013.01)

(56) References Cited

U.S. PATENT DOCUMENTS

| | | | | |
|---|---|---|---|---|
| 8,176,336 | B1* | 5/2012 | Mao | H04L 9/006 713/189 |
| 8,909,928 | B2* | 12/2014 | Ahmad | G06F 21/57 713/168 |
| 2005/0105734 | A1* | 5/2005 | Buer | G07C 9/00007 380/270 |
| 2007/0038873 | A1* | 2/2007 | Oliveira | G06F 21/10 713/193 |
| 2007/0094719 | A1* | 4/2007 | Scarlata | 726/9 |
| 2007/0300070 | A1* | 12/2007 | Shen-Orr | G06F 21/33 713/176 |
| 2008/0077592 | A1* | 3/2008 | Brodie | G06F 21/31 |
| 2009/0046861 | A1* | 2/2009 | Krishnaswamy | H04L 63/029 380/270 |
| 2009/0177892 | A1 | 7/2009 | Steeves et al. | |
| 2010/0037311 | A1* | 2/2010 | He | H04L 63/0209 726/15 |
| 2012/0131343 | A1* | 5/2012 | Choi | H04L 63/0815 713/168 |
| 2012/0198514 | A1 | 8/2012 | McCune et al. | |
| 2013/0061055 | A1* | 3/2013 | Schibuk | G06Q 20/223 713/172 |
| 2014/0006784 | A1* | 1/2014 | Walker | H04L 9/3273 713/169 |
| 2014/0122873 | A1* | 5/2014 | Deutsch | H04L 63/20 713/158 |

OTHER PUBLICATIONS

Metke, et al., "Security Technology for Smart Grid Networks", Retrieved at: «http://ieeexplore.ieee.org/stamp/stamp.jsp?tp=&arnumber=5460903», In IEEE Transactions on Smart Grid, vol. 1, Issue 1, Jun. 2010, 9 pages.
Garriss, et al., "Trustworthy and Personalized Computing on Public Kiosks", Retrieved at: «http://citeseerx.ist.psu.edu/viewdoc/download?doi=10.1.1.141.7867&rep=rep1&type=pdf», In Proceedings of the 6th International Conference on Mobile Systems, Applications, and Services, Jun. 17, 2008, 12 pages.
Gajek, et al., "TruWallet: Trustworthy and Migratable Wallet-Based Web Authentication", Retrieved at: «http://www.ei.ruhr-uni-bochum.de/media/trust/veroeffentlichungen/2010/03/24/TruWallet-GaLoSaWi2009.pdf», In Proceedings of the ACM Workshop on Scalable Trusted Computing, Nov. 13, 2009, 10 pages.
Parno, et al., "Bootstrapping Trust in Commodity Computers", Retrieved at: «http://ieeexplore.ieee.org/stamp/stamp.jsp?tp=&arnumber=5504802», In Proceedings of the IEEE Symposium on Security and Privacy, May 16, 2010, 16 pages.
Janjua et al, "Automatic Fraudulent Digital Certificate Detection", U.S. Appl. No. 13/831,338, filed Mar. 14, 2013, 53 pages.
Saboor et al, "Certificating Authority Trust Evaluation", U.S. Appl. No. 14/020,491, filed Sep. 6, 2013, 44 pages.
"International Search Report & Written Opinion Received for PCT Application No. PCT/US2014/061442", Jun. 24, 2015, 10 Pages.
"Office Action Issued in European Patent Application No. 14861153.6", dated May 2, 2017, 8 Pages.
"Office Action Issued in European Patent Application No. 14861153.6", dated Feb. 26, 2018, 8 Pages.

* cited by examiner

Figure 4
*400*

| SERVER ID 410 | CLIENT ID 420 | CLIENT NONCE 430 | MESSAGE 440 |

Figure 5
*500*

| CLIENT ID 510 | SERVER ID 520 | PUBLIC KEY 312 | CREDENTIAL SIGNATURE 530 (CLIENT NONCE 430) | SERVER NONCE 540 |

Figure 19
*1900*

| USER ID 1910 | IDENTITY PUBLIC KEY 1920 | POLICY 1930 (KEY SIZE 1932, PIN/PHRASE PARAMETERS 1934, SIMPLICITY 1936) |

1700

VERIFYING THE SECURITY OF A REMOTE SERVER

BACKGROUND

A client device may connect to a server to download data, utilize network resources, or otherwise expand the capability of the client device. The client device may access certain services available on the server that may implement various levels of security. A user of the client device may have private or personal data stored on the client device that the user does not want accessed by any malevolent actors. The malevolent actor may spoof a server or corrupt an existing server to access that private or personal data.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to using an attestation service to verify a secure server. The secure server may receive a signed trusted credential from an attestation service validating the secure server as trustworthy to a client device seeking access. The secure server may protect the signed trusted credential in a server secure module.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 4 illustrates, in a block diagram, one embodiment of an access request.

FIG. 5 illustrates, in a block diagram, one embodiment of an access response.

FIG. 19 illustrates, in a block diagram, one embodiment of an identity package.

DETAILED DESCRIPTION

Figure 1:
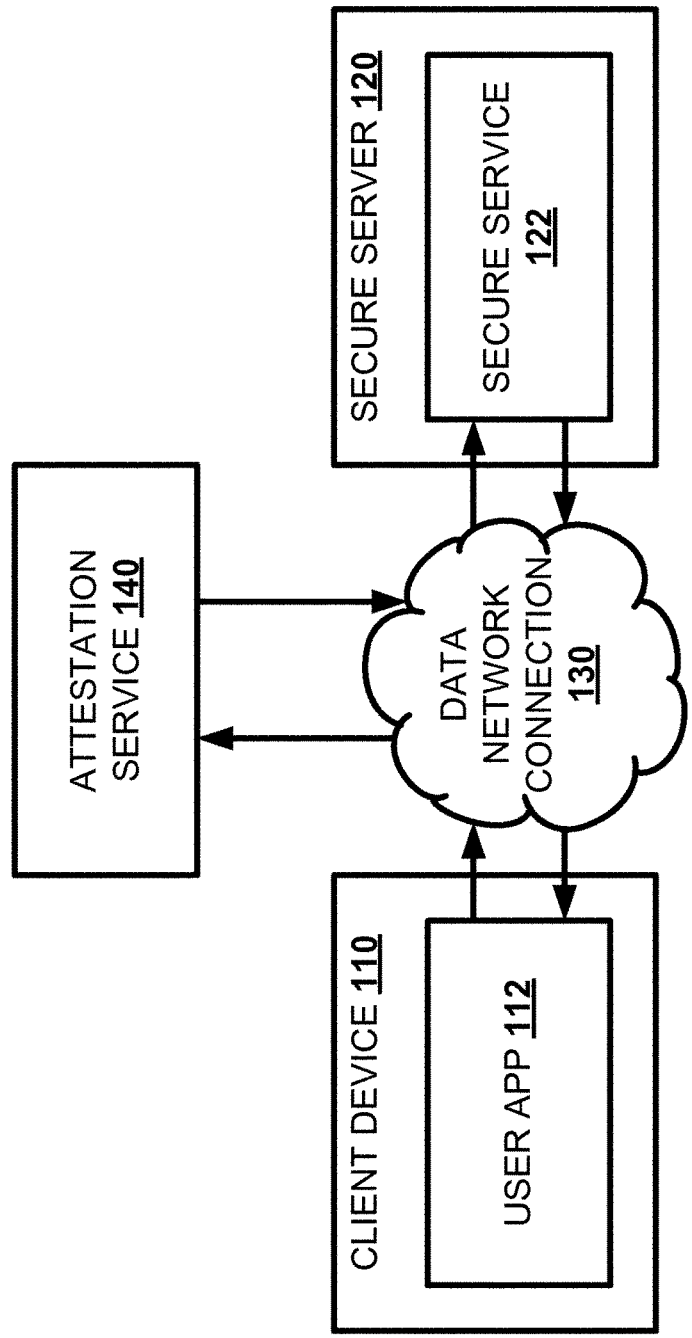
FIG. 1 illustrates, in a block diagram, one embodiment of a data network.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, a secure server, or a client device.

In the past, a public key infrastructure may rely on certificates used to sign and verify messages sent in a communication having commonly trusted root certificates. The issuer of the certificate may verify the authenticity of a requester, such as a server, by some trusted source and then issues the certificate to the requester. During communication between a client device and the server, the client device may authenticate the server by validating signatures created using the issued certificate in the possession of the server. However, the client device may have no way of discovering if a server has been compromised after a certificate has issued. If the server has been compromised, then a malevolent actor may utilize a previously issued certificate to establish communication with the client device, leading to the client device exchanging private data with a compromised entity.

To protect against such a compromise, a secure server may use a trusted third party, such as an attestation service, to securely establish a channel for communication with a client device. The client device may rely on a trusted third party, directly or indirectly, to establish the trustworthiness of a secure server. So if a secure server presents a credential key-pair, referred to herein as a "trusted credential", signed by a trusted third party, the client device may determine that the secure server is in a clean state. The client device may presume the possession of the trusted credential signed by the third party indicates that the secure server is in a good clean state. The initial clean state of the secure server may help in protecting the trusted credential from any malware on the system. The secure server may ensure the trustworthiness of the channel by using a trusted credential provisioned when the secure server is in a clean state. For example, the manufacturer may provision a trusted credential at manufacture or upon initial boot by the user. A hardware secure module may ensure the private portion of the trusted credential is not decrypted outside the secure server. A client device may ensure that any data exchange with the secure server is secure by having the secure server prove possession of the trusted credential, such as by using directly or indirectly the public portion of the trusted credential. The client device may be pre-provisioned with policies which may trust the trusted credential to uniquely identify the secure server and assure the secure server is not spoofed by a malware.

The secure server may protect the trusted credential against future compromise by preventing inadvertent export of the trusted credential and by protecting access to the trusted credential when executing any software of uncertain trustworthiness. The secure server may use a hardware secure module to protect a trusted credential, such as having a trusted platform module seal the trusted credential. The operating system may ensure that the trusted credential is made available to malware-free systems. Components outside the trusted computing base of the operating system may be restricted from accessing the trusted credential.

A secure transaction may begin with the client device sending an access request. The access request may contain any data, such as a client identifier, a client nonce, and other data. The secure server may send an access response as an acknowledgement. The access response may have a public portion of the trusted credential, along with other information that increases trust in the credential. The access response may sign the client nonce using the private portion of the trusted credential. The access response may contain additional data, such as a server identifier and a server nonce.

Upon receiving the access response, the client device may verify that the secure server is not spoofed and the trusted credential is valid. The client device may securely communicate with the secure server by establishing a secure socket layer session. In a secure socket layer session, the client device may create a session key for future communication. The client device may send this session key to the secure server. The client device may encrypt the session key using the public portion of the trusted credential received. The client device may now send user login credentials to the server access any network service on the secure server.

The client may verify the trusted credential sent by the server is not spoofed by verifying the authenticity of the trusted credential. A third party trusted by the client device may act as an attestation service, endorsing the trusted credential. The client device may be pre-provisioned with information about the attestation service. The attestation service may ensure that malware cannot masquerade as a genuine server in order to trick a client device in order to provide private information. The secure server may request the attestation service may vouch for the trusted credential. In one embodiment, the operating system manufacturer may act as the attestation service. The operating system may provision the trusted credential during a boot operation.

The secure server may structure the trusted credential to allow the attestation service to unambiguously determine that the trusted credential is genuine. The secure server may use a hardware secure module, such as a trusted platform module. The hardware secure module may have an endorsement key and an endorsement key certificate. The endorsement key certificate may chain up through a manufacturer's certification authority. A trusted platform module may generate an attestation identity key indirectly signed by the endorsement key and usable when a particular secure module has platform configuration registers in a particular state. Moreover, a trusted platform module may generate a server component log detailing measurements performed on a secure module during a boot operation. The secure module may sign the server component log with an attestation identity key, preventing spoofing.

If a secure module protects a private key of the trusted credential during provisioning, then the secure module may limit the usability of the trusted credential during loading of the operating system. The secure module may check that the operating system state matches the operating system state during provisioning of the trusted credential. Moreover, if the public key of the trusted credential is signed indirectly by an attestation identity key, then the attestation identity key may ensure that the trusted credential is protected by a hardware component. During provisioning, the secure server may generate a trusted credential key-pair using the secure module. The secure server may sign the trusted credential indirectly with an endorsement key certificate via an attestation identity key. The operating system may send a server component log, the public portion of the trusted credential, and the signature on the public key signed by the attestation identity key, along with the relevant attestation identity keys and the endorsement key certificate to the attestation service. The attestation service may verify via the server component log that the secure server is in a good clean state and that the trusted credential is protected by a secure module. The attestation service may sign the public key of the trusted credential and return the trusted credential to the secure server.

The client device may verify the authenticity of the trusted credential by implicitly trusting the attested statements of the attestation service. Alternately, the secure server may send the attestation data to the client device. The client device may contact an attestation service of the client device's choosing which may attest to the health of the secure server. The attestation data may have a list of attestation services that may perform such operation, giving the client device the ability to accept or reject any such provider on the list.

The secure server may execute a boot operation that processes a boot path to start the operating system running. On a secure server with a hardware security component like a secure module, the secure module may measure each component in the boot path by the previous component and store the value in one or more platform configuration register values on the secure module till the boot manager starts running. The boot manager may then load the boot loader to load the initial operating system binary. The operating system binary may take over loading the rest of the operating system. In the event any component in the boot chain is compromised, the secure module measurements may differ, leading to any data previously sealed by the state of the secure module when the genuine components were involved in the boot chain, such as the trusted credential, to be locked down by the secure module to prevent access.

The secure module protection of the private key may guarantee that when the initial binary of the operating system starts running the system may be in a trusted state for the purposes of using the secure module to unseal the private key of the trusted credential. The initial operating system binary may be responsible for loading the rest of the operating system. If any operating system component is deemed to be untrustworthy, then the operating system may destroy the private portion of the trusted credential, so that the trusted credential becomes inaccessible to any malware that may load later.

The operating system may use multiple techniques to detect any untrustworthy components. The operating system may execute signature verification of each component loading inside the operating system. The operating system may check each kernel component to see if those components are signed by certificates connected to trusted roots. A measured boot may rely on secure module measurements of early operating system components and early launch anti-malware mechanisms. Whenever the operating system encounters an unrecognized component, the operating system may check with any early launch anti-malware policy before loading the component. Additionally, the operating system may use an access control list to limit the trusted credentials to processes within the trusted computing base of the operating system Thus, in one embodiment, a client device may use an attestation service to verify a secure server. The secure server may receive a signed trusted credential from an attestation service validating the secure server as trustworthy to a client device seeking access. The secure server may protect the signed trusted credential in a server secure module. The client device may send an access request from a client device to a secure server. The client device may receive from the secure server a signed trusted credential provided by an attestation service validating the secure server as trustworthy and protected by a server secure module at the secure server.

FIG. 1 illustrates, in a block diagram, one embodiment of a data network 100 that uses a trusted credential. A client device 110 may connect to one or more secure servers 120 via a data network connection 130. A client device 110 may be any mobile computing device, such as a smart phone, tablet, laptop, or other computing device. The data network connection 130 may be an internet connection, a wide area network connection, a local area network connection, or other type of data network connection. A client device 110 may execute a user application 112 to connect to a secure network service 122 executed by a secure server 120 or group of secure servers 120. A secure network service 122 is a network based user service, such as e-mail, a social network, online banking, cloud resource, or other online application. Both the client device 110 and the secure server 120 may interact with an attestation service 140. The attestation service 140 is a trusted third party that the client device 110 may use to validate that the secure server 120 remains secure. The attestation service 140 may be an original equipment manufacturer, an operating system developer, or some other third party trusted by the client device or user.

Figure 2:
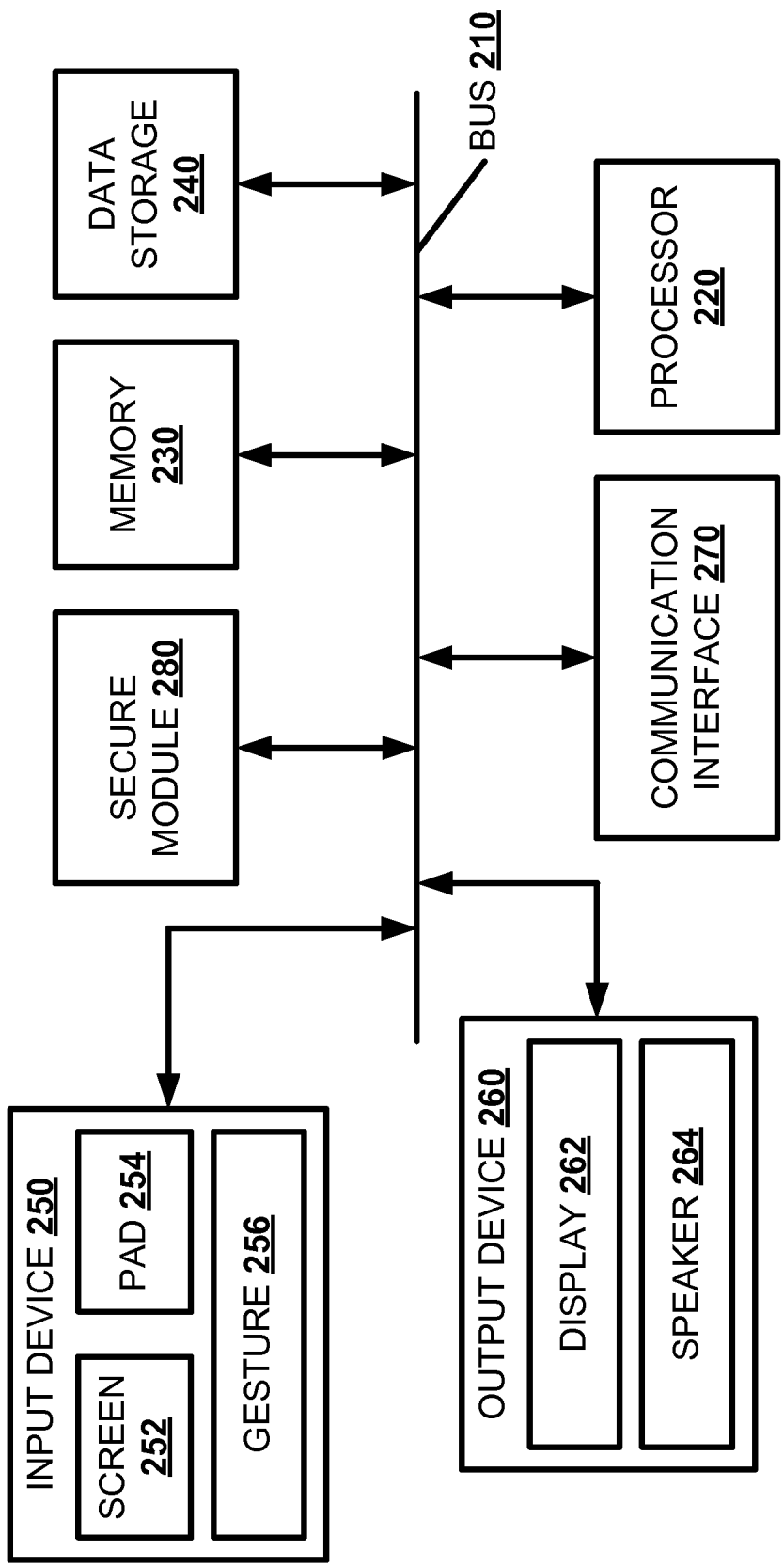
FIG. 2 illustrates, in a block diagram, one embodiment of a computing device.

FIG. 2 illustrates a block diagram of an exemplary computing device 200 which may act as a client device 110 or a secure server 120. The computing device 200 may combine one or more of hardware, software, firmware, and system-on-a-chip technology to implement a client device 110 or a secure server 120. The computing device 200 may include a bus 210, a processor 220, a memory 230, a data storage 240, an input device 250 output device 260, and a communication interface 270. The bus 210, or other component interconnection, may permit communication among the components of the computing device 200.

The processor 220 may include at least one conventional processor or microprocessor that interprets and executes a set of instructions. The memory 230 may be a random access memory (RAM) or another type of dynamic data storage that stores information and instructions for execution by the processor 220. The memory 230 may also store temporary variables or other intermediate information used during execution of instructions by the processor 220. The data storage 240 may include a conventional ROM device or another type of static data storage that stores static information and instructions for the processor 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method. The data storage 240 may also be a database or a database interface.

The input device 250 may include one or more conventional mechanisms that permit a user to input information to the computing device 200, such as a keyboard, a mouse, a voice recognition device, a microphone, a headset, a touch screen 252, a touch pad 254, a gesture recognition device 256, etc. The output device 260 may include one or more conventional mechanisms that output information to the user, including a display 262, a printer, one or more speakers 264, a headset, or a medium, such as a memory, or a magnetic or optical disk and a corresponding disk drive. The communication interface 270 may include any transceiver-like mechanism that enables computing device 200 to communicate with other devices or networks. The communication interface 270 may include a network interface or a transceiver interface. The communication interface 270 may be a wireless, wired, or optical interface.

A secure module 280 may perform computing functions or store data more securely. A secure module 280 may be a trusted platform module. A trusted platform module is a module that has security features in place to protect data during storing and processing. The secure module 280 may protect a trusted credential and the operating system boot path.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 270.

Figure 3:
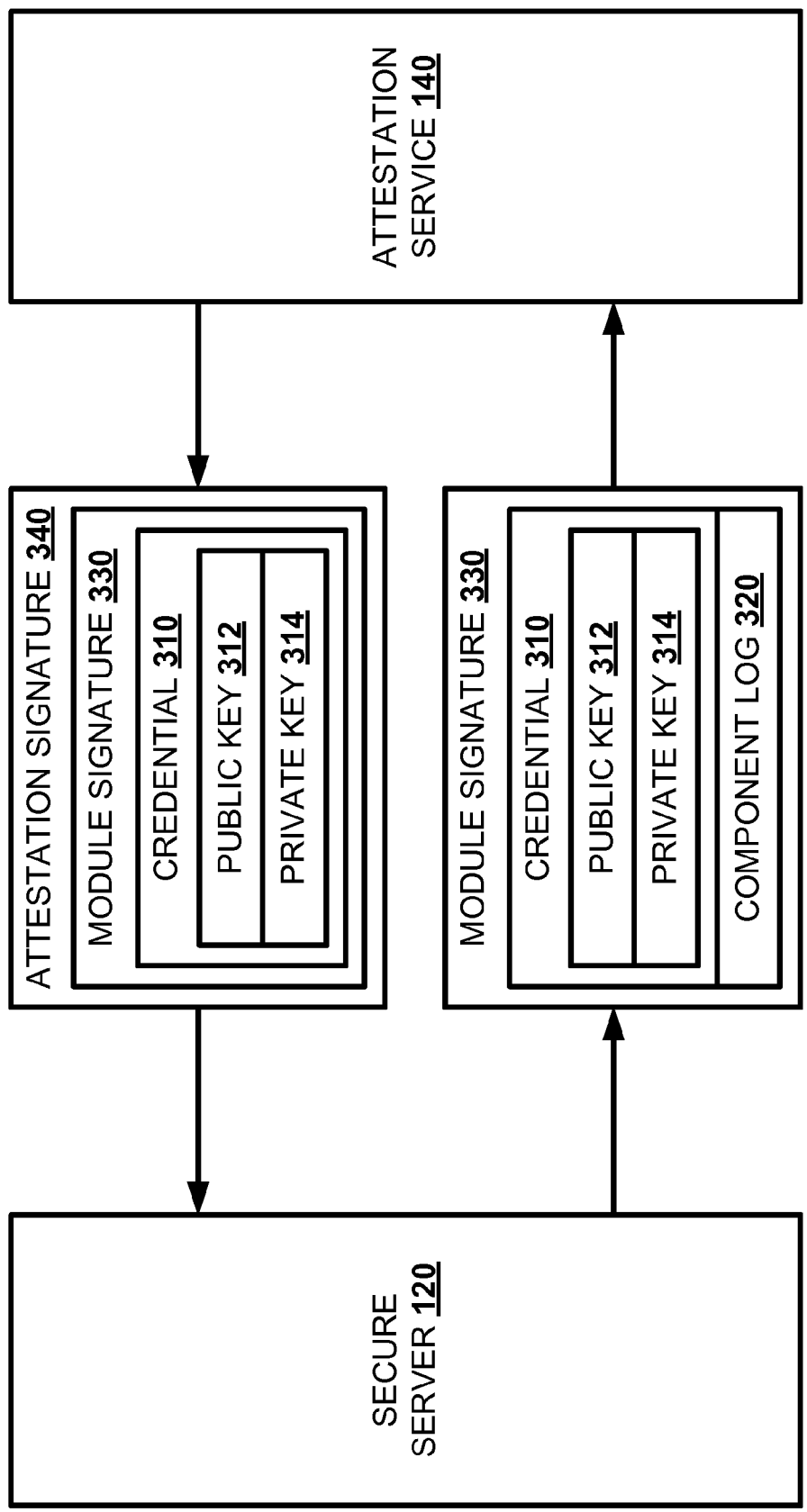
FIG. 3 illustrates, in a block diagram, one embodiment of a signed trusted credential exchange.

The client device 110 may request access to the secure server 120. The secure server may respond by providing a trusted credential signed by the attestation service 140 so that the user or the client device 110 may know that the secure server 120 remains secure. FIG. 3 illustrates, in a block diagram, one embodiment of a signed trusted credential exchange 300. A secure module 280 of the secure server 120 may generate a trusted credential 310 and a server component log 320 recording a state of an operating system component of the secure server 120 during a boot operation. The trusted credential 310 may have a public key 312 and a private key 314. A secure module 280 of the secure server 120 may apply a secure module signature 330 to the trusted credential 310 and the server component log 320. The secure module signature 330 may be unspoofable. If the secure module 280 is a trusted platform module, the trusted platform module may seal the private key 314 to the state of the platform configuration registers of the trusted platform module. Sealing the private key 314 to the platform configuration register state may guarantee that the accessibility of the private key 314 is based on the operating system booting to the same attested state as specified by the server component log 320. The secure server 120 may send the trusted credential and the server component log 320 to the attestation service 140. The attestation service 140 may have a record of the state of each operating system component of the secure server 120, as well as any valid updates to those operating system components. If the attestation service 140 finds that the server component log 320 matches the records of the attestation service 140, the attestation service 140 may apply an attestation signature 340 to the trusted credential 310. The attestation service 140 may then return the signed trusted credential 310 to the secure server 120.

The secure server 120 may then protect the signed trusted credential 310 in a server secure module 280, such as a trusted platform module. The server secure module 280 may protect the signed trusted credential 310 by preventing access to the signed trusted credential 310 unless the state of the operating system components during booting matches the state of the operating system components when the trusted credential was signed by the attestation service 140. If the signed trusted credential 310 is accessible to the operating system, then the operating system may determine that the operating system has not been compromised. The initial boot components may load the rest of the operating system. Before loading further components, the initial clean boot components may ensure that future components are trustworthy, either by signature verification or by checking against an anti-malware service like early launch anti-malware. If any component is deemed untrustworthy, the initial boot components may destroy the trusted credential 310 to prevent access by potential malware. Thus, if an attestation service 140 attests to the initial state of the operating system by signing the trusted credential 310, the attestation service 140 may attest to the operating system components protecting the trusted credential 310 from potential malware. If the client device 110 is provisioned to trust such attestation services 140, then the client device 110 may verify the trustworthiness of the trusted credential 310 of the secure server 120 signed by the attestation service 140.

The secure server 120 may receive an access request from the client device 110. FIG. 4 illustrates, in a block diagram, one embodiment of an access request 400. The access request 400 may have a server identifier 410 indicating the secure server 120 the client device 110 wants to access. The access request 400 may have a client identifier 420 indicating the client device 110 sending the access request 400. The access request may have a client nonce 430, a arbitrary one-time use number. The access request 400 may have a message body 440 to convey any other information.

The secure server 120 may reply to the access request 400 with an access response. FIG. 5 illustrates, in a block diagram, one embodiment of an access response 500. The access response 500 may have a client device identifier 510 indicating the client device 110 receiving the access response 500. The access response 500 may have a server identifier 520 indicating the secure server 120 sending the access response 500. The access response 500 may have a public key 312 of the signed trusted credential 310 so the client device 110 may validate the secure server 120. The access response 500 may apply a credential signature 530 to the client nonce 430 using the private key 314 of the signed trusted credential 310. The access response 500 may have a server nonce 540 for any replies by the client device 110.

Figure 6:
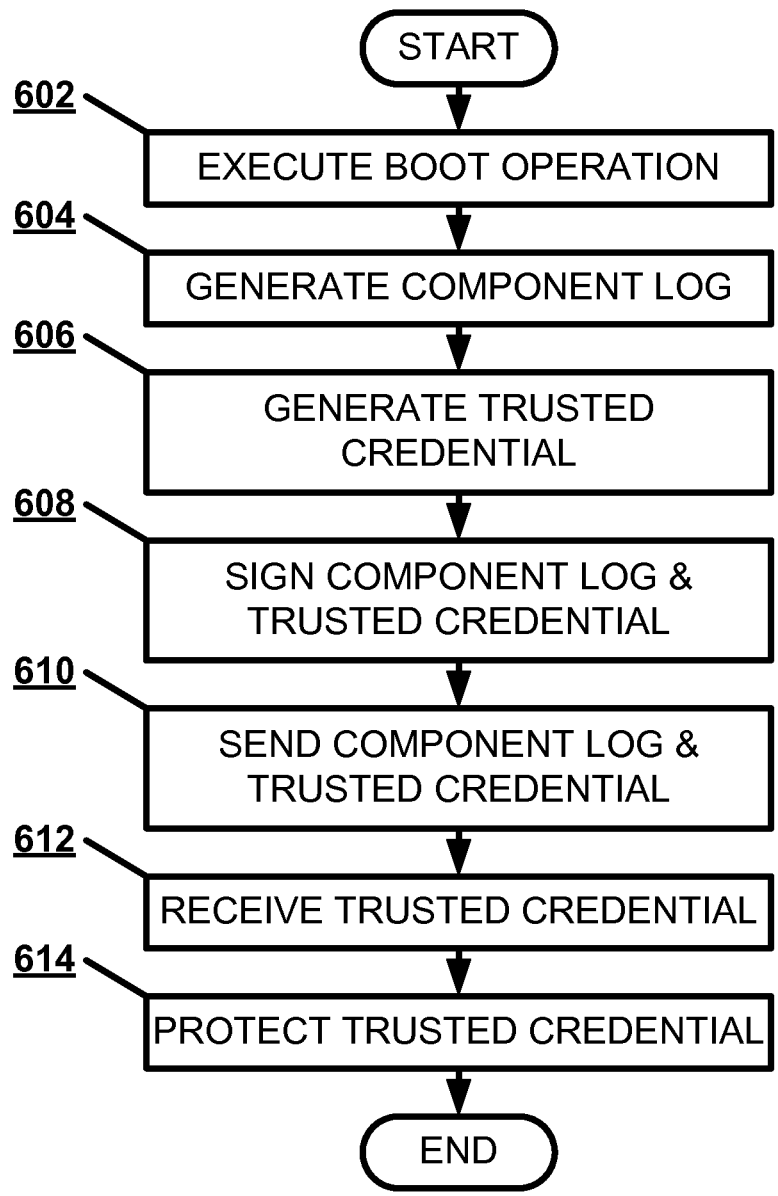
FIG. 6 illustrates, in a flowchart, one embodiment of a method of creating a signed trusted credential at a secure server.

FIG. 6 illustrates, in a flowchart, one embodiment of a method 600 of creating a signed trusted credential 310 at a secure server 120. The secure server 120 may execute a boot operation (Block 602). The secure server 120 may generate a server component log 320 recording an operating system component of the secure server 120 during a boot operation (Block 604). The secure server 120 may generate a trusted credential 310 to be sent to the attestation service 140 for signature (Block 606). The secure server 120 may sign the server component log 320 and the trusted credential 310 with a server secure module 280 (Block 608). The secure server 120 may send a server component log 320 and a trusted credential 310 signed by the server secure module 280 to the attestation service 140 (Block 610). The secure server 120 may receive a signed trusted credential 310 from an attestation service 140 validating the secure server 120 as trustworthy to a client device 110 seeking access (Block 612). The secure server 120 may protect the signed trusted credential 310 in the server secure module 280 (Block 614).

Figure 7:
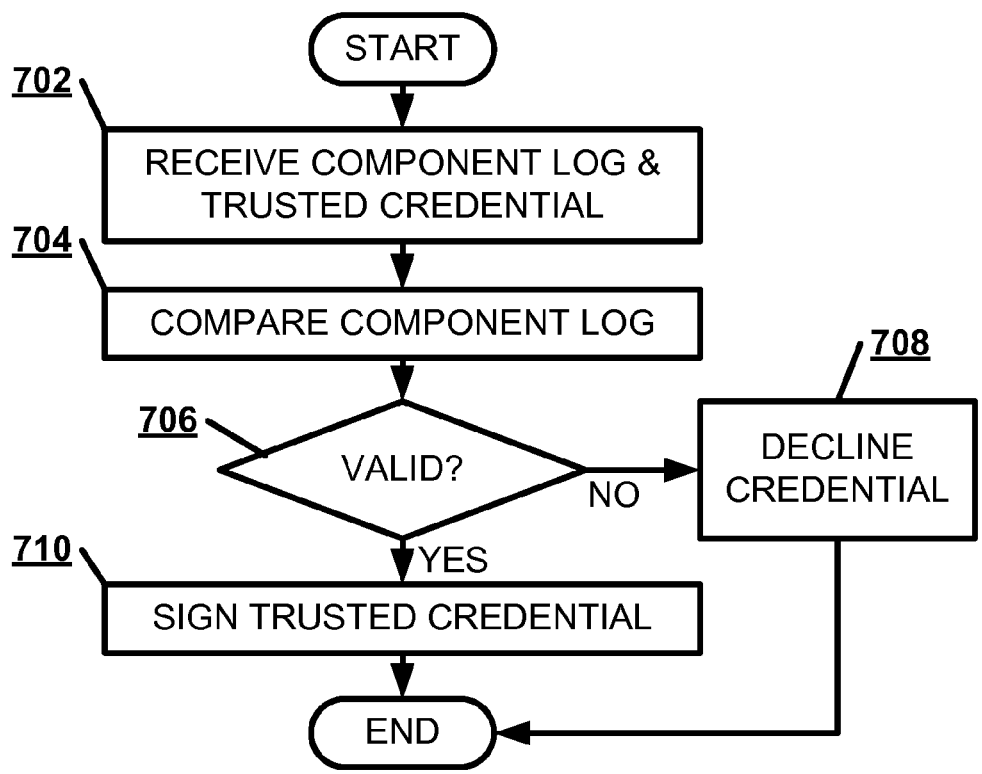
FIG. 7 illustrates, in a flowchart, one embodiment of a method of creating a signed trusted credential at an attestation service.

FIG. 7 illustrates, in a flowchart, one embodiment of a method 700 of creating a signed trusted credential 310 at an attestation service 140. The attestation service 140 may receive from the secure server 120 a server component log 320 and a trusted credential 310 signed by the server secure module 280 (Block 702). The attestation service 140 may compare the server component log 320 to recorded state of the operating system component of the secure server 120 (Block 704). If the server component log 320 indicates that the secure server 120 is invalid (Block 706), the attestation service may decline signing the trusted credential 310 (Block 708). If the server component log 320 indicates that the secure server 120 is valid (Block 706), the attestation service may sign the trusted credential 310 (Block 710).

Figure 8:
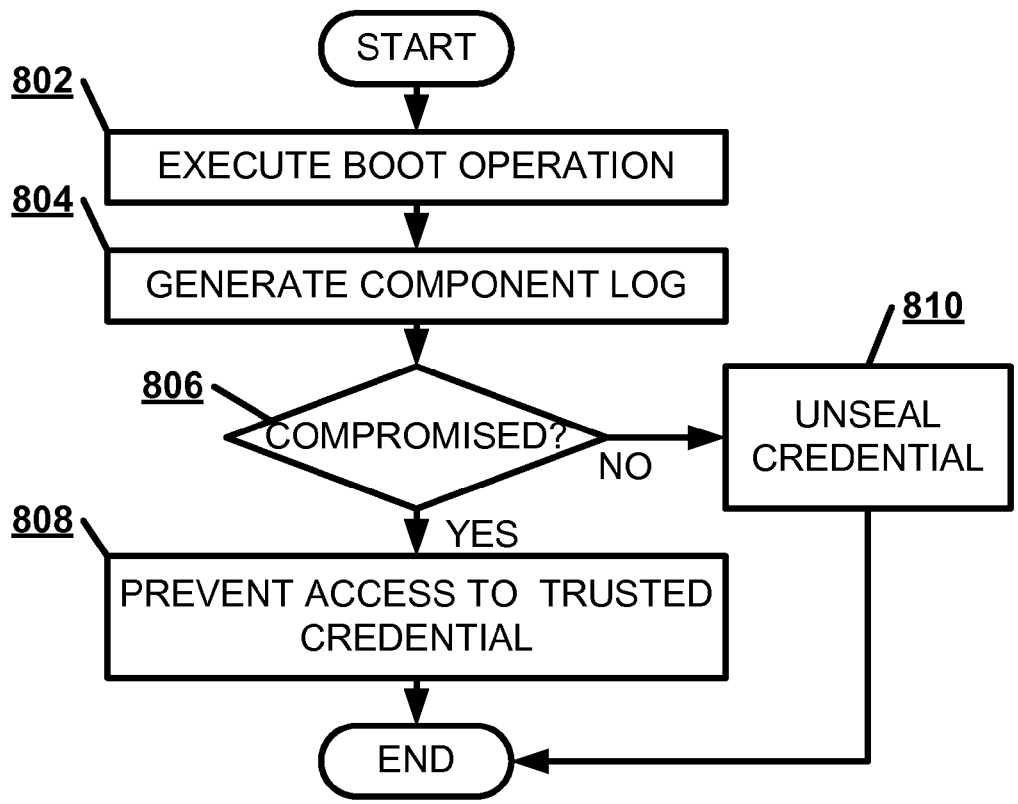
FIG. 8 illustrates, in a flowchart, one embodiment of a method of validating the integrity of a secure server.

FIG. 8 illustrates, in a flowchart, one embodiment of a method 800 of validating the integrity of a secure server 120. The secure server 120 may execute a boot operation (Block 802). The server secure module 280 of the secure server 120 may generate a server component log 320 measuring a state of an operating system component of the secure server 120 at a boot operation (Block 804). If the server component log 320 indicates that a state of an operating system component is different from the state of the operating system component when the trusted credential is generated (Block 806), the secure server module 280 of the secure server 120 may prevent access to the signed trusted credential 310 if an operating system component is compromised (Block 808). Otherwise, the secure server 120 may unseal the signed trusted credential 310 (Block 810), allowing a client device 110 to have access to the signed trusted credential 310.

Figure 9:
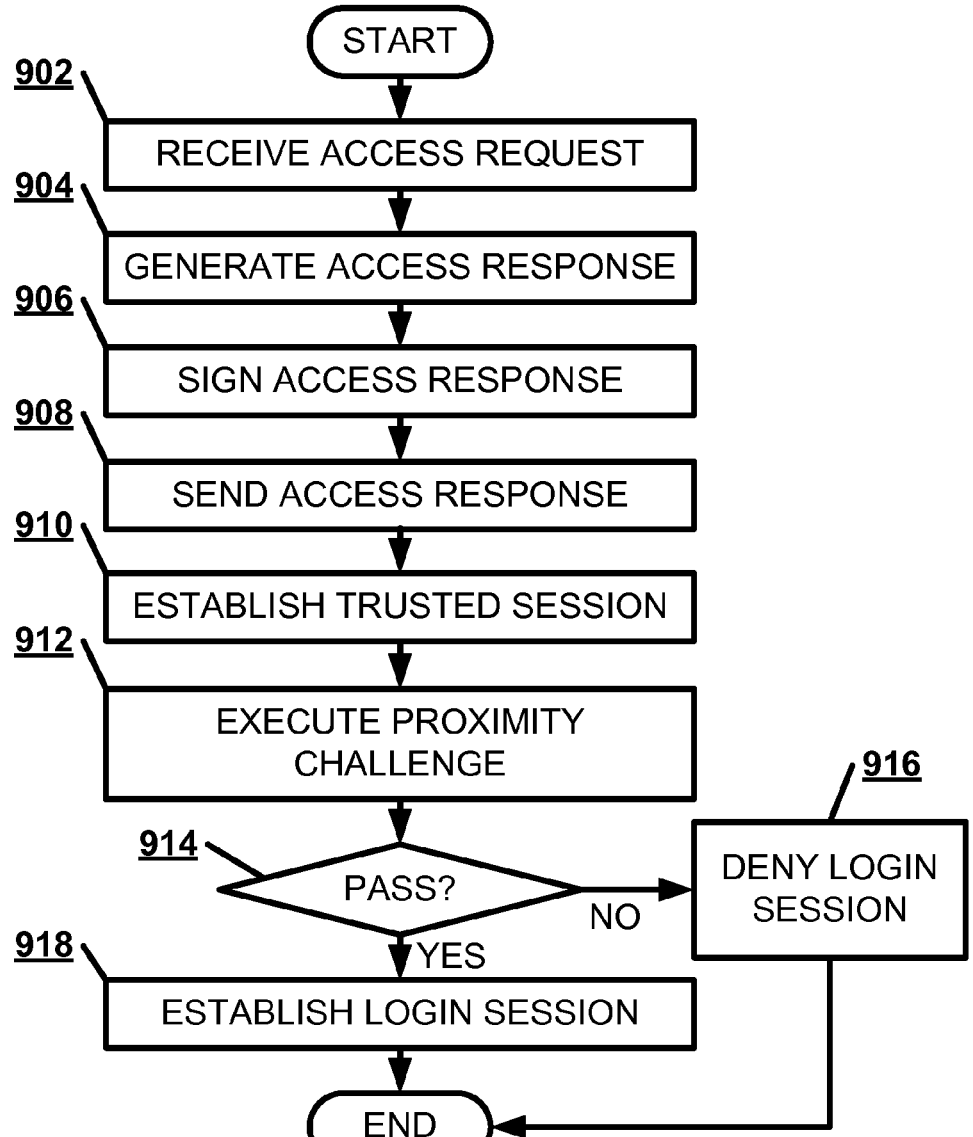
FIG. 9 illustrates, in a flowchart, one embodiment of a method of allowing access to a secure server.

FIG. 9 illustrates, in a flowchart, one embodiment of a method 900 of allowing access to a secure server 120. The secure server 120 may receive an access request 400 from a client device 110 (Block 902). The secure server 120 may generate an access response 500 to send to the client device 110 (Block 904). The secure server 120 may sign the access response 500 with the signed trusted credential 310 (Block 906). The secure server 120 may send the access response 500 signed by the signed trusted credential 310 in response to the access request 400 from the client device 110 (Block 908). The secure server 120 may establish a trusted session with a client device 110 using the signed trusted credential 310 (Block 910). The secure server 120 may execute a proximity challenge with a client device 110 upon establishing a trusted session (Block 912). A proximity challenge is a validation executed between the client device 110 and the secure server 120 at close proximity. If the client device 110 fails the proximity challenge (Block 914), the secure server 120 may deny a login session to the client device 110 (Block 916). If the client device 110 passes the proximity challenge (Block 914), the secure server 120 may establish a login session with the client device 110 (Block 918).

Figure 10:
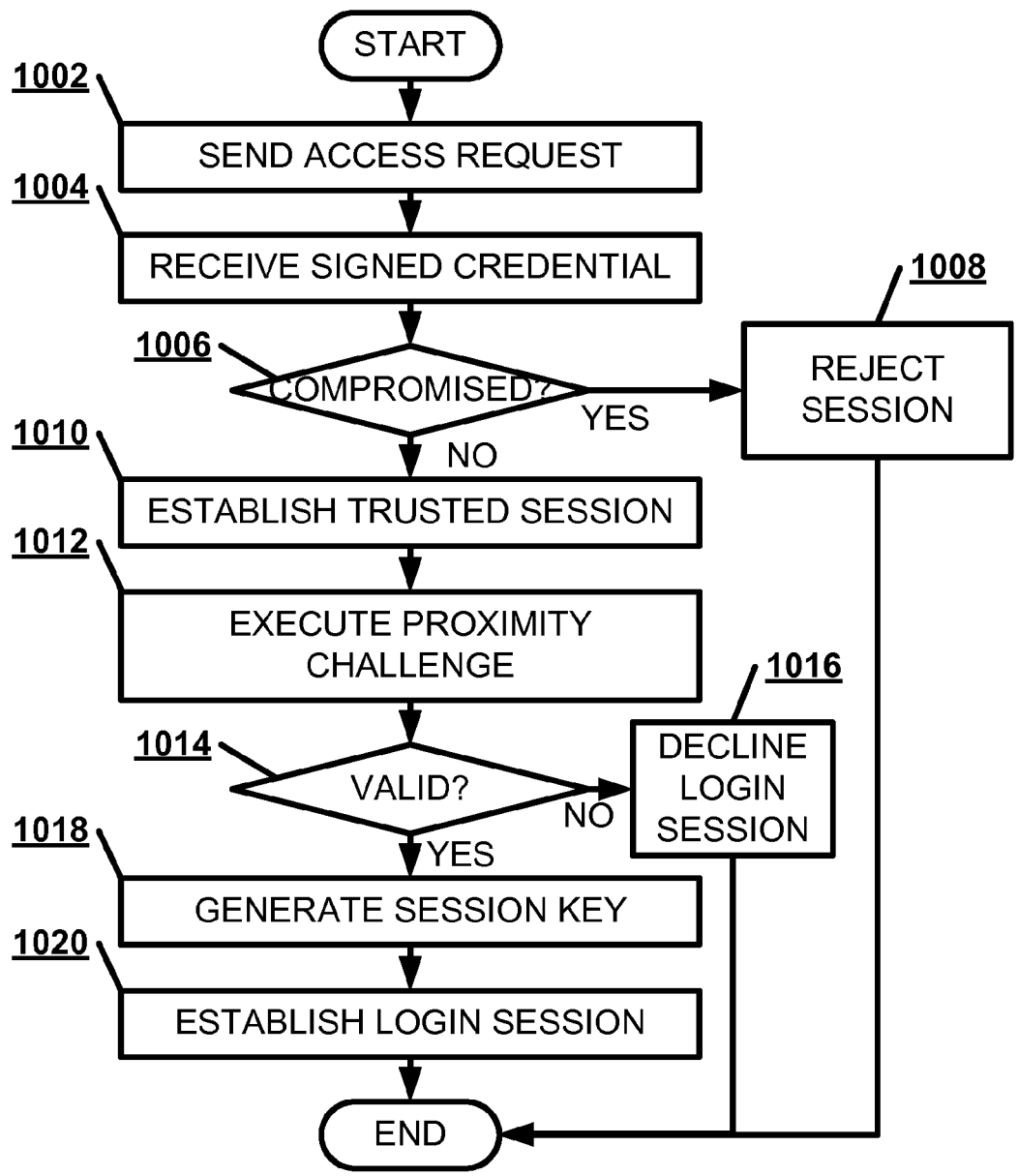
FIG. 10 illustrates, in a flowchart, one embodiment of a method of accessing a secure server with a client device.

FIG. 10 illustrates, in a flowchart, one embodiment of a method 1000 of accessing a secure server 120 with a client device 110. The client device 110 may send an access request 400 to the secure server 120 (Block 1002). The client device 110 may receive from the secure server 120 an access response 500 that may have a signed trusted credential provided by an attestation service 140 validating the secure server 120 as trustworthy and protected by a server secure module 280 at the secure server 120 (Block 1004). If the response does not have a trusted credential 310, thus indicating that the secure server 120 is compromised (Block 1006), the client device 110 may reject establishing a trusted session with the secure server 120 (Block 1008). Otherwise, the client device 110 may establish a trusted session with the secure server 120 using the signed trusted credential 310 (Block 1010). The client device 110 may execute a proximity challenge with a secure server 120 upon establishing a trusted session (Block 1012). If the secure server 120 fails the proximity challenge (Block 1014), the client device 110 may decline a login session with the secure server 120 (Block 1016). If the client device 110 passes the proximity challenge (Block 1014), the client device 110 may generate a client session key with a client secure module 280 (Block 1018). The client device 110 may establish a login session with the secure server 120 (Block 1020).

Upon establishing a trusted session between the client device 110 and the secure server 120, the client device 110 and the secure server 120 may execute one of various proximity challenges. The proximity challenges may use a client personal identification number, a server personal identification number, an image, an image key, or an identity provider service to verify that the designated client device 110 and secure server 120 are a part of the trusted session.

Figure 11:
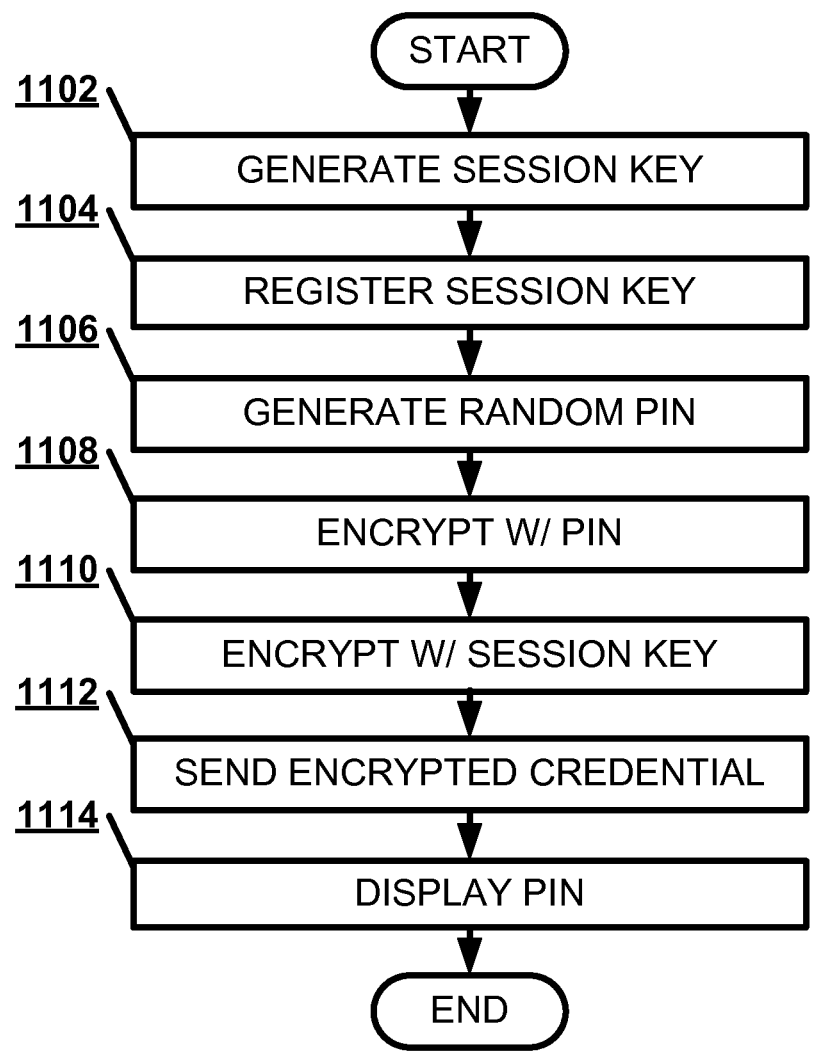
FIG. 11 illustrates, in a flowchart, one embodiment of a method of executing a proximity challenge with a client personal identification number at a client device.

FIG. 11 illustrates, in a flowchart, one embodiment of a method 1100 of executing a proximity challenge with a client personal identification number at a client device 110. Upon verifying the authenticity of the server based on the trusted credential 310, the client device 110 may generate a client session key with a client secure module 280 (Block 1102). The client device 110 may register the client session key generated by the client secure module 280 with the secure server 120 by sending the client session key encrypted to the trusted credential 310 of the secure server 120 (Block 1104). The client device 110 may randomly generate a client personal identification number (PIN) (Block 1106). The client device 110 may encrypt a user login credential using the client personal identification number (Block 1108). The client device 110 may further encrypt the user login credential with the client session key (Block 1110). The client device 110 may send the encrypted user login credential to the secure server 120 (Block 1112). The client device 110 may display the client personal identification number to the user as part of a proximity challenge (Block 1114).

Figure 12:
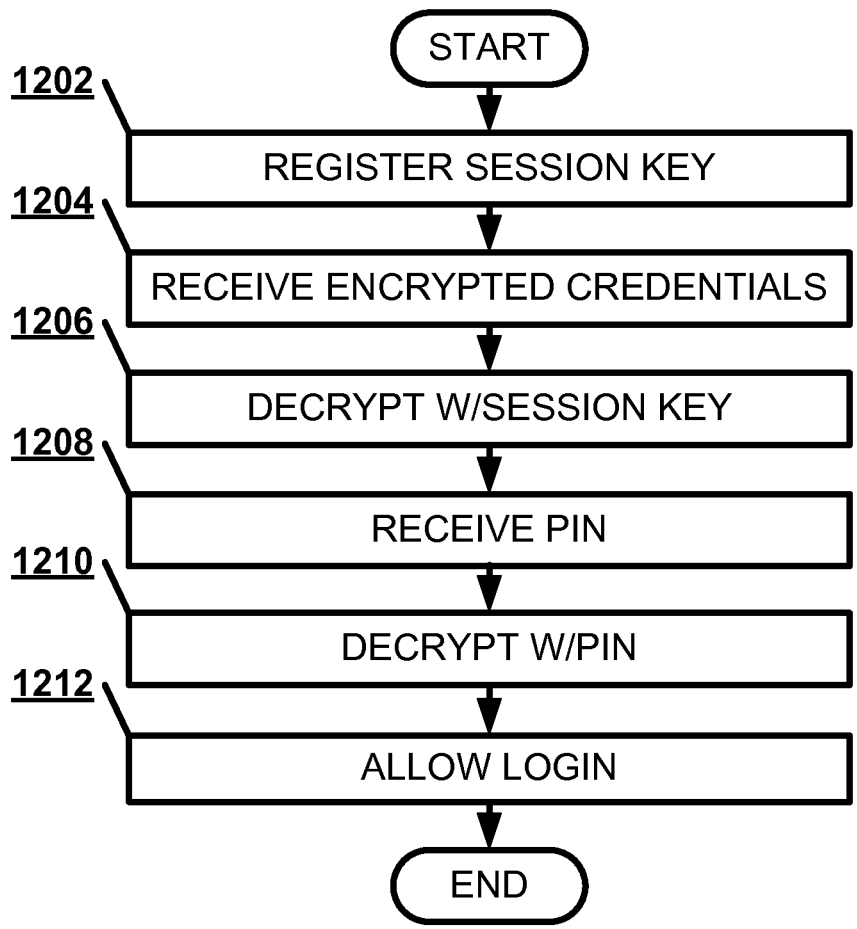
FIG. 12 illustrates, in a flowchart, one embodiment of a method of executing a proximity challenge with a client personal identification number at a secure server.

FIG. 12 illustrates, in a flowchart, one embodiment of a method 1200 of executing a proximity challenge with a client personal identification number at a secure server 120. The secure server 120 may register a client session key from the client device 110 (Block 1202). The secure server 120 may receive the encrypted user login credential from the client device 110 (Block 1204). The secure server 120 may decrypt the encrypted user login credential with the client session key (Block 1206). The secure server 120 may receive a client personal identification number input by the user (Block 1208). The secure server 120 may decrypt the encrypted user login credential with the client personal identification number (Block 1210). The secure server 120 may allow the client device 110 to login to the secure service 122 based on the user login credential (Block 1212).

Figure 13:
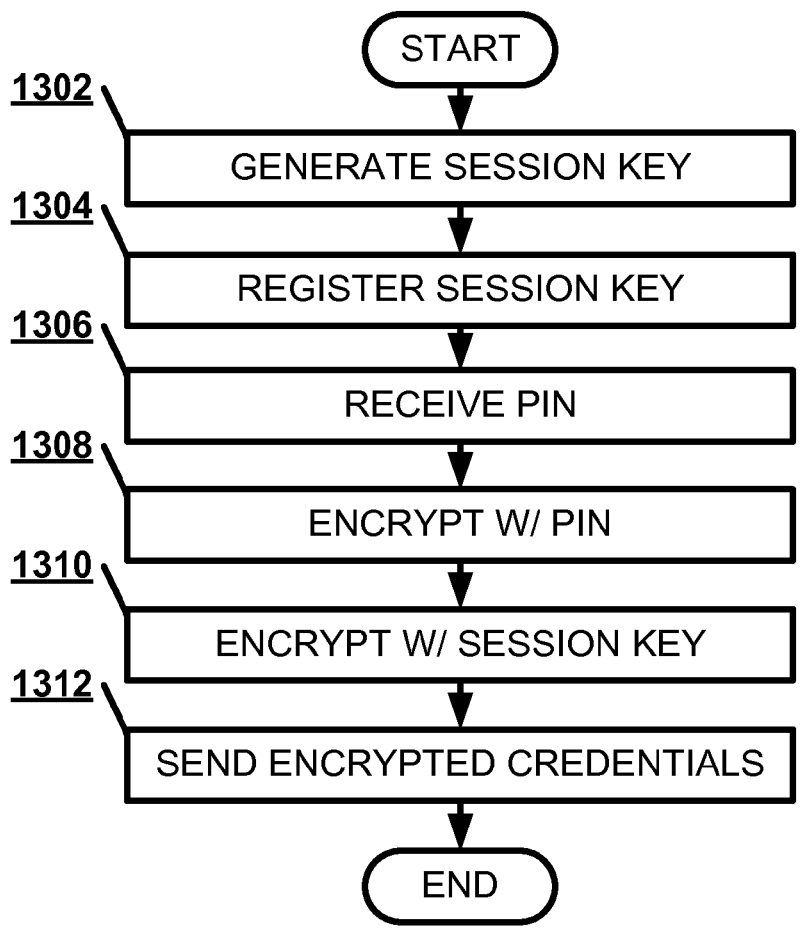
FIG. 13 illustrates, in a flowchart, one embodiment of a method of executing a proximity challenge with a server personal identification number at a client device.

FIG. 13 illustrates, in a flowchart, one embodiment of a method 1300 of executing a proximity challenge with a server personal identification number at a client device 110. Upon verifying the authenticity of the server based on the trusted credential 310, the client device 110 may generate a client session key with a client secure module 280 (Block 1302). The client device 110 may register the client session key generated by the client secure module 280 with the secure server 120 by sending the client session key encrypted to the trusted credential 310 of the secure server 120 (Block 1304). The client device 110 may receive a server personal identification number input by the user (Block 1306). The client device 110 may encrypt a user login credential using the server personal identification number (Block 1308). The client device 110 may further encrypt the user login credential with the client session key (Block 1310). The client device 110 may send the encrypted user login credential to the secure server 120 (Block 1312).

Figure 14:
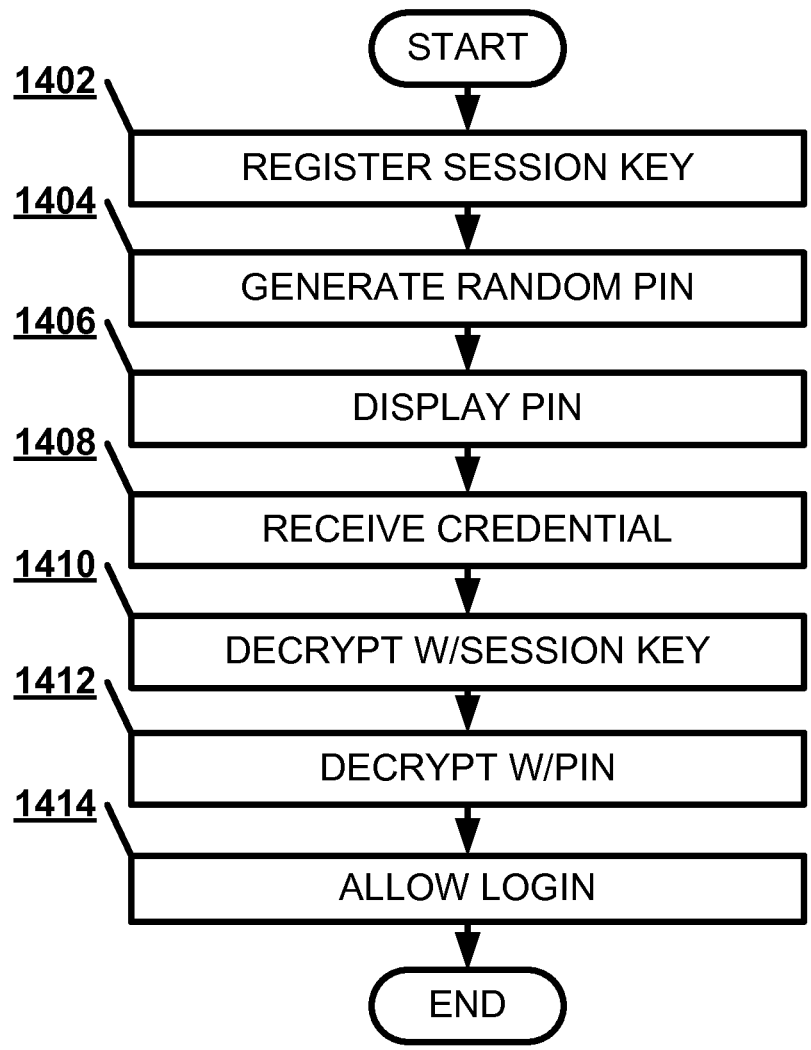
FIG. 14 illustrates, in a flowchart, one embodiment of a method of executing a proximity challenge with a server personal identification number at a secure server.

FIG. 14 illustrates, in a flowchart, one embodiment of a method 1400 of executing a proximity challenge with a server personal identification number at a secure server 120. The secure server 120 may register a client session key from the client device 110 (Block 1402). The secure server 120 may randomly generate a server personal identification number (Block 1404). The secure server 120 may display the server personal identification number to a user as part of a proximity challenge (Block 1406). The secure server 120 may receive the encrypted user login credential from the client device 110 (Block 1408). The secure server 120 may decrypt the encrypted user login credential with the client session key (Block 1410). The secure server 120 may further decrypt the encrypted user login credential with the server personal identification number (Block 1412). The secure server 120 may allow the client device 110 to login to the secure service 122 based on the user login credential (Block 1414).

Figure 15:
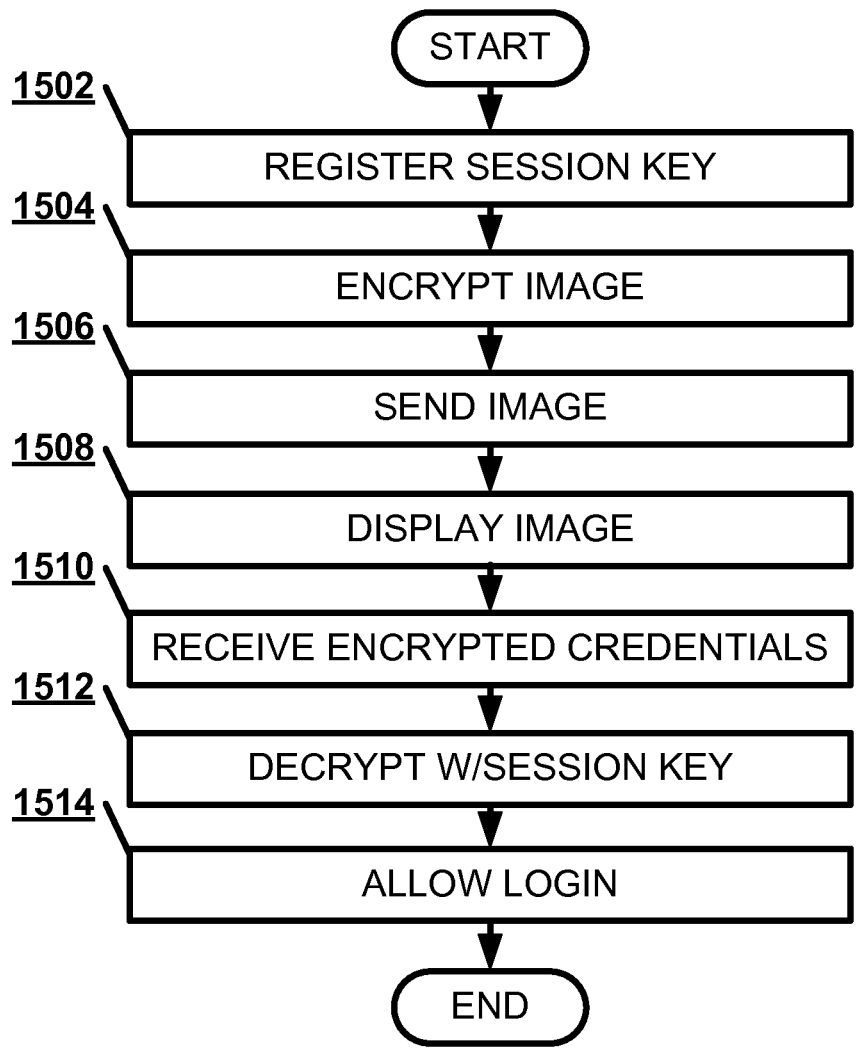
FIG. 15 illustrates, in a flowchart, one embodiment of a method of executing a proximity challenge with an image at a secure server.

FIG. 15 illustrates, in a flowchart, one embodiment of a method 1500 of executing a proximity challenge with an image at a secure server 120. The secure server 120 may register a client session key from the client device 110 (Block 1502). The secure server 120 may encrypt an image with the client session key (Block 1504). The secure server 120 may send the encrypted image to the client device 110 (Block 1506). The secure server 120 may display the image to a user as part of a proximity challenge (Block 1508). The secure server 120 may receive a user login credential encrypted by a client session key from the client device 110 (Block 1510). The secure server 120 may decrypt the encrypted user login credential with the client session key (Block 1512). The secure server 120 may allow the client device 110 to login to the secure service 122 based on the user login credential (Block 1514).

Figure 16:
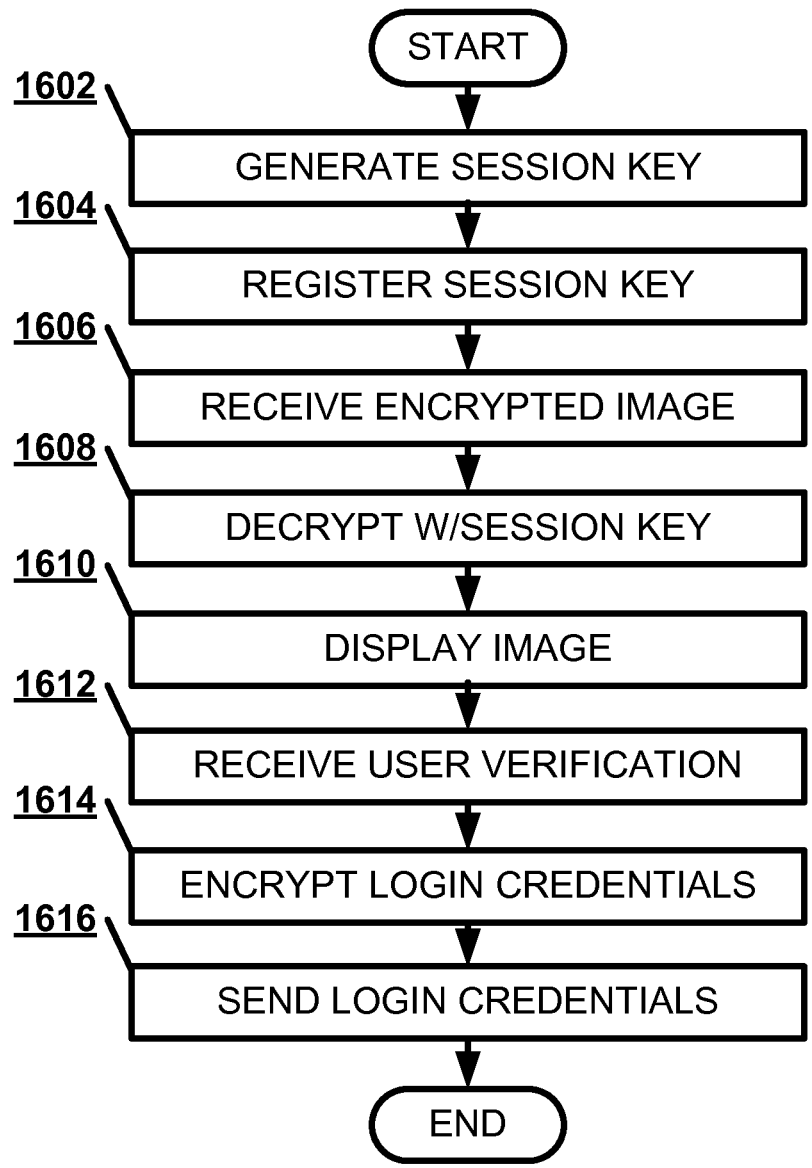
FIG. 16 illustrates, in a flowchart, one embodiment of a method of executing a proximity challenge with an image at a client device.

FIG. 16 illustrates, in a flowchart, one embodiment of a method 1600 of executing a proximity challenge with an image at a client device 110. Upon verifying the authenticity of the server based on the trusted credential 310, the client device 110 may generate a client session key with a client secure module 280 (Block 1602). The client device 110 may register a client session key generated by a client secure module 280 with a secure server 120 by sending the client session key encrypted to the trusted credential 310 of the secure server 120 (Block 1604). The client device 110 may receive an encrypted image from the secure server 120 (Block 1606). The client device 110 may decrypt the image using the client session key (Block 1608). The client device 110 may display the image to the user as part of a proximity challenge (Block 1610). The client device 110 may receive a user verification from the user if the image shown by the client device 110 matches the image shown by the secure server 120 (Block 1612). The client device 110 may encrypt the user login credential with the client session key (Block 1614). The client device 110 may send the encrypted user login credential to the secure server 120 (Block 1616).

Figure 17:
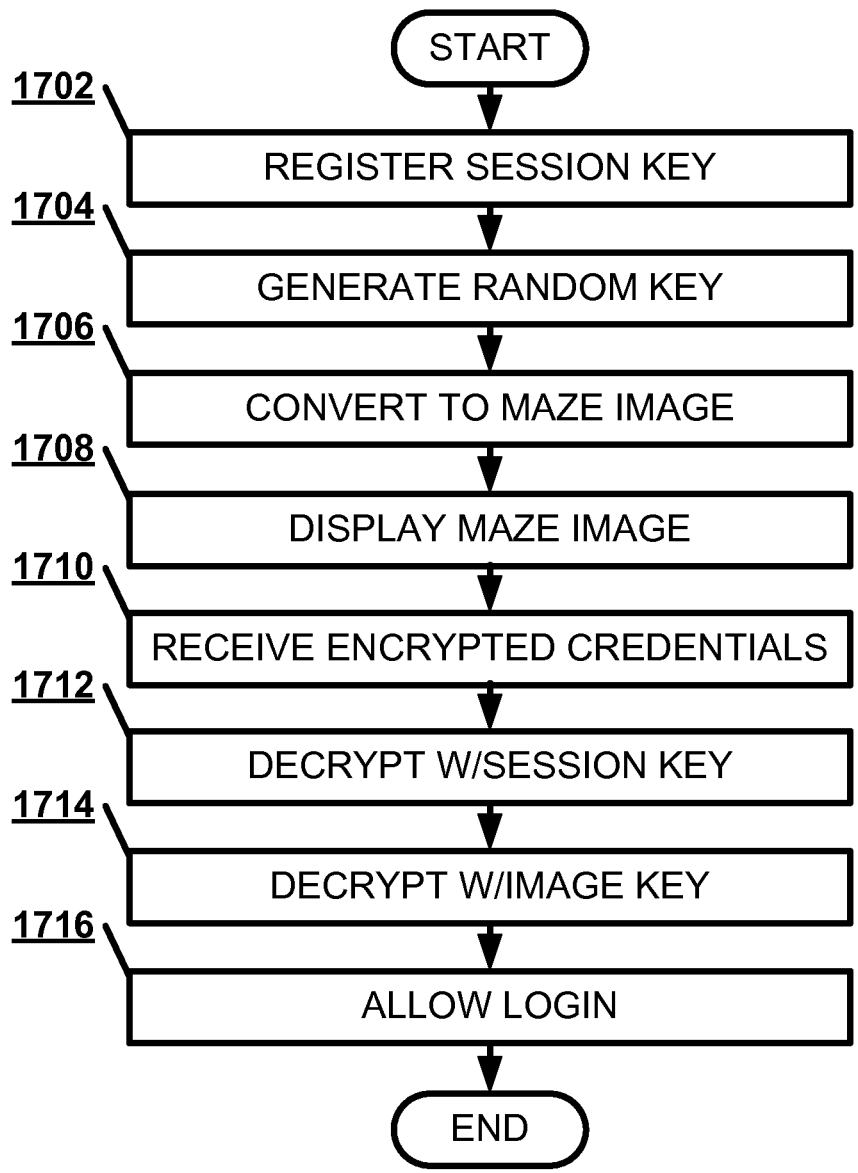
FIG. 17 illustrates, in a flowchart, one embodiment of a method of executing a proximity challenge with an image key at a secure server.

FIG. 17 illustrates, in a flowchart, one embodiment of a method 1700 of executing a proximity challenge with an image key at a secure server 120. The secure server 120 may register a client session key from the client device 110 (Block 1702). The secure server 120 may generate a random key (Block 1704). The secure server 120 may convert the random key to a maze image to create an image key (Block 1706). The secure server 120 may display the maze image for scanning by the client device 110 (Block 1708). The secure server 120 may receive the encrypted user login credential from the client device 110 (Block 1710). The secure server 120 may decrypt the encrypted user login credential with the client session key (Block 1712). The secure server 120 may further decrypt the encrypted user login credential with the image key (Block 1714). The secure server 120 may allow the client device 110 to login to the secure service 122 based on the user login credential (Block 1716).

Figure 18:
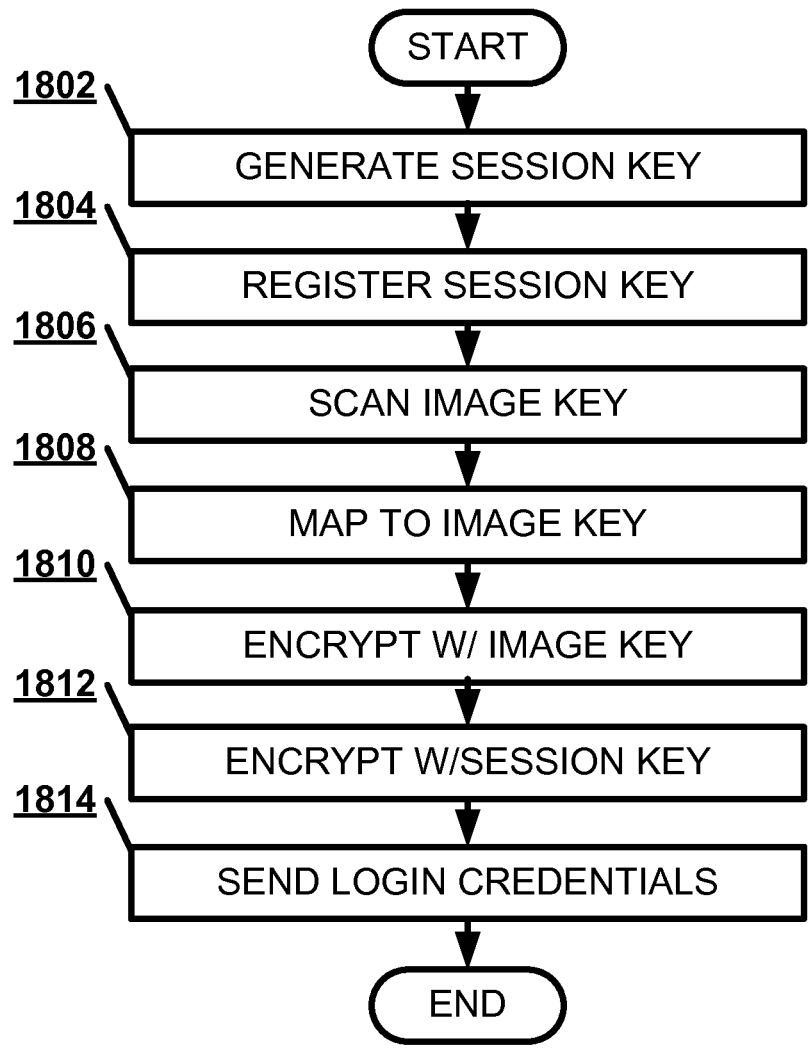
FIG. 18 illustrates, in a flowchart, one embodiment of a method of executing a proximity challenge with an image key at a client device.

FIG. 18 illustrates, in a flowchart, one embodiment of a method 1800 of executing a proximity challenge with an image key at a client device 110. Upon verifying the authenticity of the server based on the trusted credential 310, the client device 110 may generate a client session key with a client secure module 280 (Block 1802). The client device 110 may register a client session key generated by a client secure module 280 with a secure server 120 by sending the client session key encrypted to the trusted credential 310 of the secure server 120 (Block 1804). The client device 110 may scan an image from the secure server 120 (Block 1806). The client device 110 may map the image to an image key (Block 1808). The client device 110 may encrypt the user login credential with the image key (Block 1810). The client device 110 may further encrypt the user login credential with the client session key (Block 1812). The client device 110 may send the encrypted user login credential to the secure server 120 (Block 1814).

The client device 110 and the secure server 120 may use an identity provider service to validate the client device 110 and the secure server 120. An identify provider service is an online service that either a client device 110 or a secure server 120 may use to verify a user's identity. The client device 110 may register an identity package 1900 with the identity provider service.

FIG. 19 illustrates, in a block diagram, one embodiment of an identity package 1900. The identity package 1900 may have a user name or user identifier 1910 to indicate the user sending the identity package 1900. The identity package 1900 may have an identity public key 1920 matching a private key stored in the client secure module 280. The identity package 1900 may have a policy 1930 for using the identity public key 1920. The policy 1930 may be based on a policy provided by the secure server 120 or the identifier provider service. The policy 1930 may list a key size 1932 for the identity public key 1920. The policy 1930 may list a personal identification number or passphrase parameter 1934. The policy 1930 may list a simplicity flag 1936 indicating whether the public key may use a simple Yes/No acceptance request.

Figure 20:
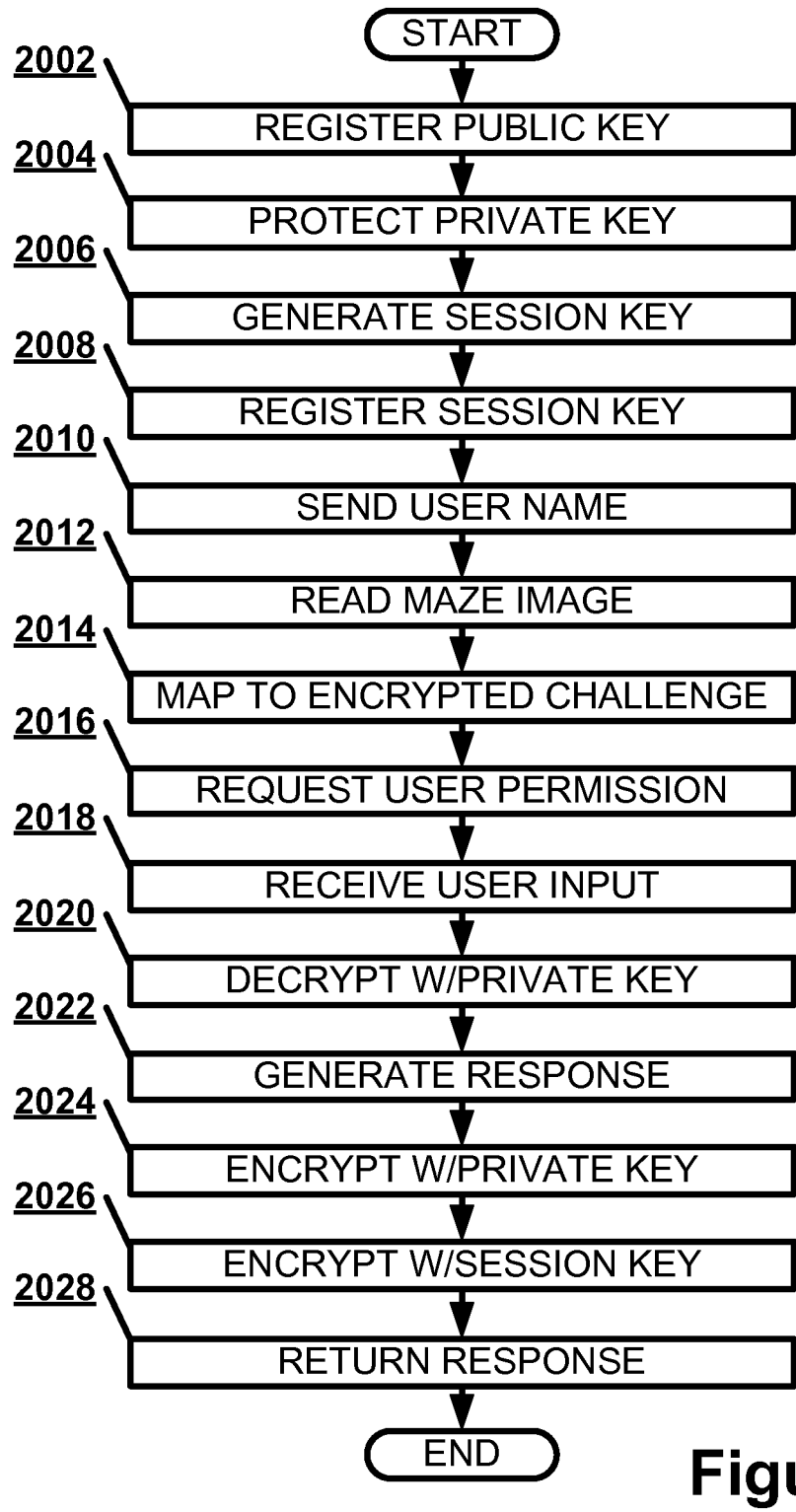
FIG. 20 illustrates, in a flowchart, one embodiment of a method of executing a proximity challenge with an identity provider service at a client device.

FIG. 20 illustrates, in a flowchart, one embodiment of a method 2000 of executing a proximity challenge with an identity provider at a client device 110. Previously, the client device 110 may register an identity package 1900 having an identity public key 1920 and a policy 1930 with an identity provider service (Block 2002). The client device 110 may protect a matching identity private key with a client secure module 280 (Block 2004). Upon verifying the authenticity of the server based on the trusted credential 310, the client device 110 may generate a client session key with a client secure module 280 (Block 2006). The client device 110 may register a client session key generated by a client secure module 280 with a secure server 120 by sending the client session key encrypted to the trusted credential 310 of the secure server 120 (Block 2008). The client device 110 may send a user name or user identifier to the secure server 120 (Block 2010). The client device 110 may read a maze image from the secure server 120 (Block 2012). The client device 110 may map the maze image to an encrypted challenge (Block 2014). The client device 110 may request user permission to use the private key (Block 2016). The client device 110 may receive a user input indicating permission to use the private key (Block 2018). The client device 110 may decrypt the encrypted challenge using the private key (Block 2020). The client device 110 may use the data in the decrypted challenge to generate a challenge response (Block 2022). The client device 110 may encrypt the challenge response using the private key (Block 2024). The client device 110 may encrypt the challenge response using the client session key (Block 2026). The client device 110 may return the challenge response to the secure server 120 (Block 2028).

Figure 21:
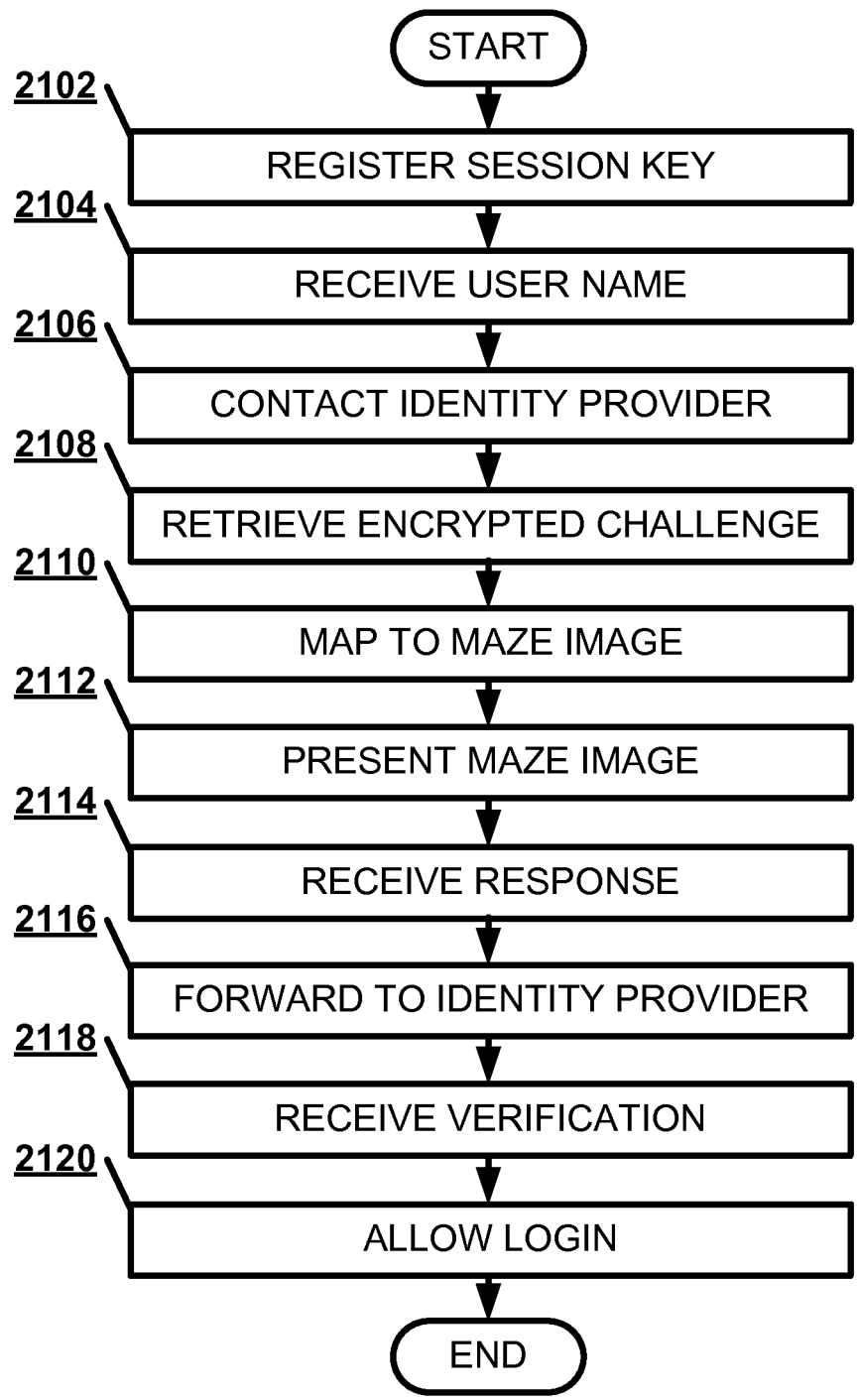
FIG. 21 illustrates, in a flowchart, one embodiment of a method of executing a proximity challenge with an identity provider service at a secure server.

FIG. 21 illustrates, in a flowchart, one embodiment of a method 2100 of executing a proximity challenge with an identity provider at a secure server 120. The secure server 120 may register a client session key from the client device 110 (Block 2102). The secure server 120 may receive a user name or user identifier from the client Device 110 (Block 2104). The secure server 120 may contact the identity provider service with the user name or user identifier from the client device (Block 2106). The secure server 120 may retrieve a challenge encrypted by an identity public key 1920 stored with the identity provider service (Block 2108). The secure server 120 may map the encrypted challenge to a maze image (Block 2110). The secure server 120 may present the maze image to a user (Block 2112). The secure server 120 may receive a challenge response from the client device 110 (Block 2114). The secure server 120 may forward the challenge response to the identity provider service (Block 2116). The secure server 120 may receive verification from the identity provider service (Block 2118). The secure server 120 may allow the client device 110 to login to the secure service 122 (Block 2120).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
   generating a server component log recording an operating system component of a secure server during a boot operation;
   sending the server component log signed by a server secure module to a trusted third party performing as an attestation service to execute a comparison of the server component log to a recorded state of the operating system component;
   receiving in the secure server a signed trusted credential from the attestation service validating the secure server as trustworthy to a client device seeking access based on the comparison;
   protecting the signed trusted credential in the server secure module to prevent decryption of the signed trusted credential outside the secure server;
   proving possession of the signed trusted credential to ensure any data exchange with the client device is secure;
   receiving a client session key encrypted with the trusted credential from the client device, the client session key being used for communications of a trusted session; and
   displaying a proximity challenge to a user as a validation of the trusted session executed at close proximity between the user device and the secure server upon establishing the trusted session, wherein the proximity challenge is communicated between the client device and the secure server encrypted by the client session key,
   wherein displaying the proximity challenge comprises:
      receiving an encrypted user login credential from the client device;
      decrypting the encrypted user login credential using the client session key;
   receiving a client personal identification number input by the user;
   decrypting the encrypted user login credential with the client personal identification number; and
   allowing the client device to login to the secure server based on the user login credential being decrypted twice.

2. The method of claim 1, further comprising:
   generating a trusted credential to be sent to the attestation service for signature.

3. The method of claim 1, further comprising:
   preventing access to the signed trusted credential if an operating system component is compromised.

4. The method of claim 1, further comprising:
   sending an access response signed by the signed trusted credential in response to an access request from the client device.

5. The method of claim 1, further comprising:
   establishing the trusted session with the client device using the signed trusted credential.

6. The method of claim 1, further comprising:
   receiving a login credential encrypted by a client session key from the client device.

7. The method of claim 1, wherein displaying the proximity challenge comprises:
   encrypting an image with the client session key;
   sending the encrypted image to the client device; and
   displaying the image to a user.

8. The method of claim 1, further comprising:
   contacting an identity provider service with a user identifier from the client device.

9. The method of claim 1, further comprising:
   retrieving a challenge encrypted by an identity public key stored with an identity provider service.

10. A non-transitory machine-readable medium having a set of instructions detailing a method stored thereon that when executed by one or more processors cause the one or more processors to perform the method, the method comprising:
    sending an access request from a client device to a secure server;
    receiving from the secure server a signed trusted credential provided by a trusted third party performing as an attestation service validating the secure server as trustworthy based on a comparison of a recorded state of an operating system component of a secure server to a server component log recording the operating system component during a boot operation, the signed trusted credential protected by a server secure module at the secure server;
    ensuring any data exchange with the secure server is secure by having the secure server prove possession of the signed trusted credential;
    generating a client session key with a client secure module, the client session key being encrypted with the trusted credential and being used for communications of a trusted session; and
    displaying a proximity challenge to a user as a validation of the trusted session executed at close proximity between the user device and the secure server upon establishing the trusted session, wherein the proximity challenge is communicated between the client device and the secure server encrypted by the client session key,
    wherein displaying the proximity challenge comprises:
    randomly generating a client personal identification number;
    displaying the client personal identification number to a user;
    encrypting a user login credential using the client personal identification number;
    encrypting the user login credential further with the client session key; and
    sending the twice encrypted user login credential to the secure server.

11. The non-transitory machine-readable medium of claim 10, wherein the method further comprises:
    registering the client session key generated by the client secure module with the secure server.

12. The non-transitory machine-readable medium of claim 10, wherein displaying the proximity challenge comprises:
    receiving an encrypted image from the secure server;
    decrypting the encrypted image using the client session key; and
    displaying the decrypted image.

13. The non-transitory machine-readable medium of claim 10, wherein the method further comprises:
    registering an identity public key and a policy with an identity provider service.

14. A secure server, comprising:
    at least one processor configured to generate a server component log recording an operating system component during a boot operation;
    a communication interface configured to:
        send the server component log signed by a server secure module to a trusted third party performing as an attestation service to execute a comparison of the server component log to a recorded state of the operating system component,
        receive a signed trusted credential from the attestation service validating the secure server as trustworthy,
        respond to an access request from a client device with an access response signed by the signed trusted credential to prove possession of the signed trusted credential to ensure any data exchange with the client device is secure, and
        receive a client session key encrypted with the trusted credential from the client device, the client session key being used for communications of a trusted session;
    a server secure module configured to protect the signed trusted credential and an operating system boot path to prevent decryption of the signed trusted credential outside the secure server; and
    a display configured to present a proximity challenge to a user as a validation of the trusted session executed at close proximity between the user device and the secure server upon establishing the trusted session, wherein the proximity challenge is communicated between the client device and the secure server encrypted by the client session key,
    wherein the communication interface is further configured to:
        receive an encrypted user login credential from the client device;
        decrypt the encrypted user login credential using the client session key;
    receiving a client personal identification number input by the user;
        decrypt the encrypted user login credential with the client personal identification number; and
        allow the client device to login to the secure server based on the user login credential being decrypted twice.

15. The secure server of claim 14, wherein the display is configured to present at least one of an image and a personal identification number to a user as part of the proximity challenge.

16. The secure server of claim 14, further comprising:
    a user input configured to receive a client personal identification number input by the user.

17. The secure server of claim 14, wherein the at least one processor is further configured to decrypt an encrypted user login credential with the client session key.

* * * * *